United States Patent [19]

Chatelot

[11] Patent Number: 4,864,633
[45] Date of Patent: Sep. 5, 1989

[54] INDUCTIVE DEVICE FOR THE RAPID EXCHANGE OF DATA BETWEEN TWO DATA CARRIERS

[75] Inventor: Denis Chatelot, La Roche Foucault, France

[73] Assignee: La Telemecanique Electrique, France

[21] Appl. No.: 162,544

[22] Filed: Mar. 1, 1988

[30] Foreign Application Priority Data

Mar. 2, 1987 [FR] France ................................ 87 02761

[51] Int. Cl.⁴ ............................................. H04B 5/00
[52] U.S. Cl. ......................................... 455/41; 455/83; 455/193
[58] Field of Search ...................... 455/41, 84, 87, 120, 455/123, 125, 193; 334/63, 71; 381/79; 246/63 A, 167 R, 187 B; 340/825.54

[56] References Cited

U.S. PATENT DOCUMENTS

| | | | |
|---|---|---|---|
| 3,656,132 | 4/1972 | Brumbelow | 455/41 |
| 4,172,995 | 10/1979 | Yoshisato | 455/87 |
| 4,462,113 | 7/1984 | Iwata | 455/41 |
| 4,520,474 | 5/1985 | Vilmur | 455/87 |
| 4,550,444 | 10/1985 | Uebel | 455/41 |
| 4,669,109 | 5/1987 | Le Cheviller et al. | 455/41 |

Primary Examiner—Robert L. Griffin
Assistant Examiner—Curtis Kuntz
Attorney, Agent, or Firm—William A. Drucker

[57] ABSTRACT

An inductive device is provided for the rapid data exchange between two data carriers, more particularly between a fixed station and a movable carrier, usable in industrial process automation systems an automatic tuning circuit is provided for maintaining the frequency of the resonating circuit of the inductive device at a nominal value; the tuning circuit includes a comparator means which compares a signal representative of the frequency of the circuit with a reference value. A tuning means receives from the comparator an error signal so as to cause the frequency of the resonating circuit to return to its nominal value.

8 Claims, 1 Drawing Sheet

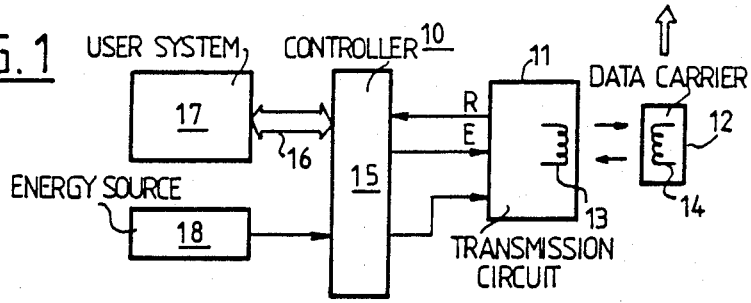
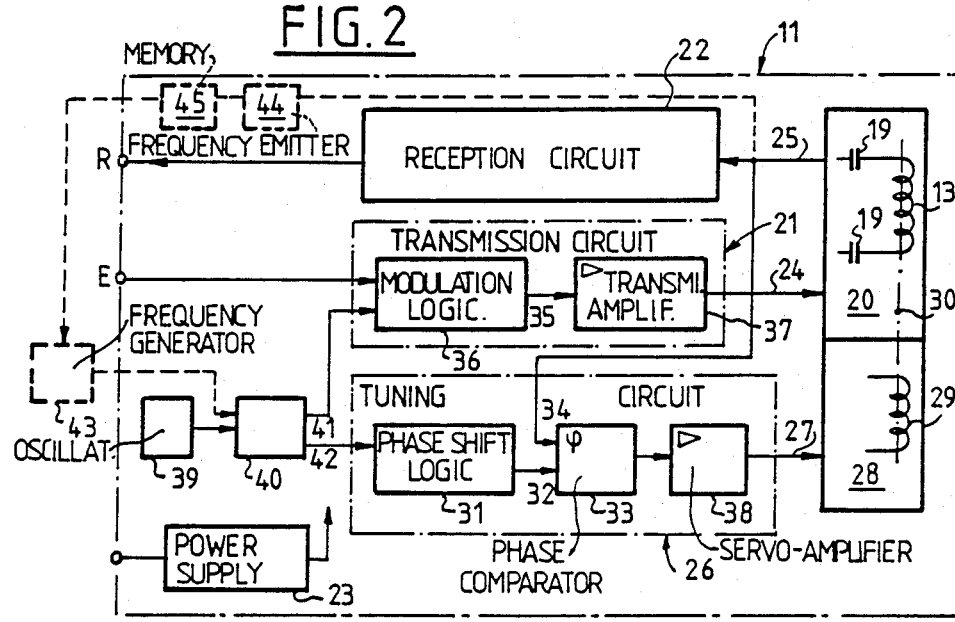
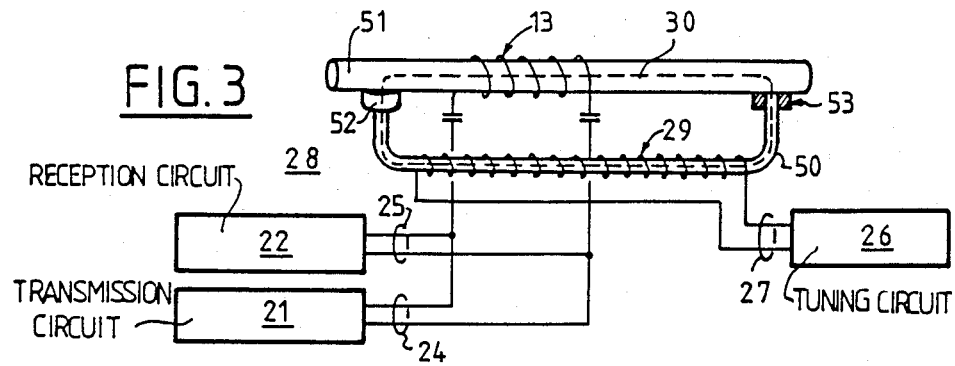

INDUCTIVE DEVICE FOR THE RAPID EXCHANGE OF DATA BETWEEN TWO DATA CARRIERS

BACKGROUND OF THE INVENTION

The present invention relates to a device for the rapid data exchange between two data carriers, more particularly between a fixed station and a movable carrier, by the inductive transmission of logic signals. Such a device is used especially in industrial process automation systems.

For providing inductive transmission of logic signals between a movable data carrier and a fixed reading-writing station, it is known to use:
- a resonating circuit connected to an energy source and comprising at least one transmission coil which can be magnetically coupled to a corresponding coil of the data carrier and wound on a high permeability ferrite bar, and a capacitor tuning said circuit to a given frequency;
- a circuit for transmitting and a circuit for receiving logic signals, electrically connected to the transmission coil so that this latter has passing therethrough a high frequency current which can be modulated by said signals;
- a logic circuit for controlling the exchange, connectable on the one hand to the transmission and reception circuits and on the other to a user system; the resonating circuit may have a single transmission coil operating at transmission and reception or two transmission coils one of which operates at transmission and the other at reception.

It has been observed that the presence of metal pieces in the vicinity of the mobile data carrier causes disturbances which risk altering the data exchange between the fixed station and the mobile data carrier. In addition, the dispersion of the values of the components of the transmission circuit, particularly of the capacitors of this circuit, may also cause mistuning of the resonating circuit and consequently the appearance of disturbing signals producing confusion with the useful signals.

Finally, the temperature variations undergone by the device, in particular by the ferrite bar, also risk altering the data exchange.

SUMMARY OF THE INVENTION

The purpose of the present invention is to overcome these drawbacks of known inductive data exchange devices using simple means.

Another object is to provide rapid and reliable data exchange inductively between a mobile data carrier and a fixed reading-writing station in an industrial environment.

The invention relates to a device of the type described in the preamble, comprising:
- an automatic tuning circuit for maintaining the frequency of the resonating circuit at a nominal value and including a comparator means, this means comparing a signal representative of the frequency of the circuit with a reference value and delivering an error signal as a function of their difference; and
- a tuning means receiving said error signal and associated with the resonating circuit so as to cause the frequency of this latter to come back to its nominal value.

The data exchange between the data carrier, for example mobile and the reading-writing station, for example fixed, which contains the resonating circuit, the transmission circuit and the reception circuit and the logic control circuit is thus improved. Consequently a rapid and reliable data exchange may be made with a user system such as a programmable automaton or other system controlling an industrial process.

Preferably, the tuning means includes a tuning coil associated with the magnetic circuit of the transmission coil and having a DC current flowing therethrough which is the image of the error signal. The DC current may be generated by a servo-amplifier connected to a phase comparator. Thus, the automatic tuning desired is achieved in a simple manner by superimposing a DC magnetic field for correcting the high frequency magnetic field.

In an extremely simple embodiment, the magnetic circuit is advantageously common to the transmission coil and to the tuning coil and includes for the transmission coil a ferrite bar or similar and for the tuning coil a soft iron U shaped core or similar; the ends of the legs of the U shaped core adjacent the bar are preferably surrounded by electrically conducting rings forming a screen for the high frequency magnetic field.

BRIEF DESCRPTION OF THE DRAWINGS

Other features and advantages of the invention will be clear from reading the following description of a non limitative embodiment.

FIG. 1 is a block diagram illustrating one emodiment of a data exchange device in an industrial environment in accordance with the invention;

FIG. 2 is a block diagram showing the transmission, reception and tuning circuits of the device of FIG. 1;

FIG. 3 shows a preferred embodiment of the automatic tuning means.

DESCRIPTION OF THE PRFERRED EMBODIMENTS

The data exchange device 10 shown in FIG. 1 includes a reading-writing station 11 and a data carrier 12 connected to a moving means, for example a pallet carrying a product being processed during a manufacturing process.

It is obvious that carrier 12 may also be carried by a person or an animal. The data exchange is to take place by bidirectional inductive transmission of logic signals between a transmission coil 13 of station 11 and a transmission coil 14 of the data carrier 12 so as to read data out from and write date into this latter. The transmission coils 13, 14 are transmission-reception coils, but one or the other could be replaced by a transmission coil and a reception coil.

The data carrier includes transmission and reception circuits to be coupled to a resonant circuit to which coil 14 belongs ; it also comprises a logic interposed between the transmission and reception circuits and a data memory or other digital supply. The power supply may be self-contained; it uses in the present case the energy received from station 11 via the inductive connection.

The reading-writing station is connected through transmission and reception lines to a controller or an interface 15 itself connectdd by a bus 16 to a user system 17 formed for example by a programmable automaton. An energy source 18 supplies the interface 15, the readingwriting station 11 and, via the inductive connection, the data carrier 14.

The controller 15 is a logic circuit controlling the exchange. It dialogues with the user system on the one hand, to interpret the orders given by this latter and to transmit them to the mobile data carrier 12 via the reading-writing station 11, and on the other hand to respond to the user system as a function of the data read from the data carrier 12 by station 11. The controller 15 reiterates the messages as a precaution in the case of an error of transmission. Some of the elements described here as belonging to station 11 may be disposed in the controller 15.

As can be soon in greater detail in FIG. 2, the reading-writing station 11 includes a resonating circuit 20, a transmission circuit 21 and a reception circuit 22 for the logic signals exchanged with the mobile data carrier 12, as well as a power supply 23 connected to the energy source 18 feeding the different circuits.

The resonating circuit 20 includes coil 13 and at least one capacitor 19 and it is connected by conductors 24, 25 to the respective circuits 21, 22. In accordance with the invention station 11 includes an automatic tuning circuit 26. The tuning circuit 26 is intended to maintain the frequency of the resonating circuit at a nominal value and it is connected by a connection 27 to a tuning means 28 comprising a coil 29 associated with the magnetic circuit 30 of the transmission coil 13.

The tuning circuit 26 comprises a phase shift logic 31 connected to a first input 32 of a phase comparator 33, a second input 34 of which is connected to coil 13 for example via conductor 25. A modulation logic 36 forms part of the transmission circuit 21. The output 35 of logic 36 is connected to a transmission amplifier 37 whose output is connected to conductor 24. The DC output of the phase comparator 33 is connected to a servo-amplifier 38 whose output is coupled to the resonating circuit 20 via the conductor 27.

It should be noted that the reading-writing station 11 has in addition a clock formed of a quartz oscillator 39 connected to a frequency divider 40 whose outputs 41, 42 drive respectively the modulation logic 36 and the phase shift logic 31. In a variant illustrated with broken lines in FIG. 2, the clock may be formed by a frequency generator 43 included in the controller and connected to coil 13 via a device 44 measuring the frequency received and a memory 45, so as to match it to the frequency of the data carrier FIG. 3 illustrates a preferred embodiment of the tuning means 28 connected by connection 27 to the tuning circuit 26. Coil 29 of the tuning means 28 is wound on a core formed by a soft iron U shaped element 50 or similar, whereas coil 13 of the resonating circuit is wound on a ferrite bar 51. The ends of the legs of the U shaped element 50 are adjacent bar 51 so as to close the magnetic circuit 30 and are surrounded by electrically conducting rings 52, 53, made for example from copper, and forming a screen for the high frequency magnetic field.

The phase shift logic 31 comprises a phase shift circuit for adjusting the reference value applied to the input 32 of the phase comparator 33 so that the output signal of the comparator is zero in the case of correct tuning.

The device shown in the Figs. operates in the following way when the mobile data carrier 12 is stopped or passes in the vicnity of station 11. When transmission operation is ordered by controller 15, the user system 17 emits instructions via bus 16. Controller 15 then sends a succession of logic signals to terminal E of the reading-writing station 11. These signals are processed by the modulation logic 36 so as to modulate a carrier frequency for example of a nominal frequency of F = 895 KHz delivered by the output 41 of the frequency divider 40; the modulated carrier is amplified by amplifier 37 and the resonating circuit 20 generates a modulated high frequency magnetic field. The magnetic coupling between coil 13 of the fixed station and coil 14 of the mobile data carrier 12 defines in the resonating circuit of the data carrier a modulated carrier suitably demodulated and proccessed by data carrier 12 for storing therein the desired date.

When reception mode operation is ordered by controller 15, the high frequency magnetic field appearing because of the proximity of data carrier 12 induces in coil 13 a current which is demodulated and processed by circuit 22 so as to generate at terminal R of station 11 a succession of logic signals retransmitted by controller 15 to the user system 17.

If the frequency of the resonating circuit 20 diverges from the nominal value F, the signal at the input 34 of the phase comparator 33 diverges from the fixed phase shift delivered at input 32 by the phase shifter of logic 31. The result is, at the output of the comparator, a DC error signal amplified by the amplifier 38 for feeding the tuning coil 29; this latter induces a DC magnetic field in the soft iron core 50. This DC magnetic field may thus be superimposed on the alternating field in bar 30 and in the vicinity thereof, so that the frequency of the resonating circuit is brought back to its nominal value.

In another embodiment, not shown, of the invention, a frequency comparator replaces the phase comparator and compares the frequency of the resonating circuit with a reference frequency.

What is claimed is:

1. A device for the rapid exchange of data between a reading-writing station and a movable data carrier by the inductive transmission of logic signals, said reading-writing station comprises:

i-a capacitor connected to one common emitting-receiving coil which is wound on a high permeability ferrite bar of a magnetic circuit and which can be magnetically coupled to a corresponding coil of the data carrier, said capacitor and said coil forming a part of a resonating circuit which can be tuned to a frequency;

ii-an emitting circuit and a receiving circuit, both connected to the said common coil, the emitting circuit comprising means for transmitting to said common coil a high frequency current which can be modulated by said signals and the receiving circuit comprising means for receiving a high frequency current induced in the common coil by a high frequency magnetic field generated by said corresponding coil;

iii-an automatic tuning circuit for maintaining the frequency of the resonating circuit at a nominal value, said automatic tuning circuit comprising a comparator means which compares a signal representative of the frequency of the resonating circuit with a reference value and which delivers an error signal corresponding to a difference between the said frequency and the said nominal value, a tuning means including a tuning coil acting on the said magnetic circuit and means for energizing the tuning coil by a DC current having a value which varies as a function of the error signal, so as to generate a corrective magnetic field in the magnetic circuit which causes the said frequency to be stabilized to the nominal value.

2. The device as claimed in claim 1, wherein said magnetic circuit is common to the emitting-receiving coil and to the tuning coil.

3. The device as claimed in claim 2, wherein said common magnetic circuit includes:
   i-for the emitting-receiving coil a core formed by a ferrite bar;
   ii-for the tuning coil a core formed by a soft iron U shaped element having two legs provided with ends which are adjacent the bar.

4. The device as claimed in claim 3, wherein the said ends are surrounded by electrically conducting rings forming a screen for a high frequency magnetic field.

5. The device as claimed in claim 1, wherein the comparator means of the tuning circuit includes a phase comparator a first input of which receives the reference value and a second input is connected to the resonating circuit, said comparator having an output which is connected to the tuning coil through a servoamplifier.

6. The device as claimed in claim 5, wherein the first input of the comparator is connected to a phase shift logic which has a phase shift circuit for adjusting the reference value so that the phase comparator has an output signal which presents a zero value in the case of correct tuning.

7. The device as claimed in claim 6, wherein a frequency generator is connected via a frequency divider to the phase shift logic of the tuning circuit and to a modulation logic of the emitting circuit.

8. The device as claimed in claim 6, which further comprises means for tuning the frequency generator to the high frequency current transmitted to the emitting-receiving coil by an emitting circuit.

* * * * *